Aug. 30, 1960     A. J. IMMESOETE     2,950,845

TIMING ADJUSTMENT FOR PLANTERS

Filed Dec. 3, 1958

*INVENTOR.*
ARTHUR J. IMMESOETE

BY

ATTORNEYS

1

United States Patent Office 2,950,845
Patented Aug. 30, 1960

2,950,845

TIMING ADJUSTMENT FOR PLANTERS

Arthur J. Immesoete, Moline, Ill., assignor to Deere & Company, Moline, Ill., a corporation of Delaware Filed Dec. 3, 1958, Ser. No. 777,978

1 Claim. (Cl. 222—370)

The present invention relates generally to agricultural implements and more particularly to planters and the like.

The object and general nature of this invention is the provision of means for insuring accurate seed selecting when hill dropping or check rowing. Planters constructed and arranged for hill dropping and check rowing are conventionally equipped with means for accumulating a selected number of seeds and then depositing the accumulated group in a hill.

Conventional planters operating in this way are generally equipped with mechanism including a train of gearing for selectively advancing the seed plate periodically such distances as to deposit two, three or four kernels at each cycle of operation into the closed valve means. At the end of each of such selections, the seed plates comes to rest and remains at rest until the beginning of the next cycle of seed selection.

In the modern multi-row planter the means for periodically advancing the seed plates through the selected range includes not only the train of gearing mentioned above but also periodically actuated self-interrupting clutch means and in addition a speed change gearing unit that is adapted to be adjusted so as to advance the seed plate the desired amount, whether for two, three or four kernel selection.

As will be readily apparent, the plate-advancing motion is thus transmitted through a multiplicity of parts and wear of the parts and/or any manufacturing tolerances thereof are cumulative so that for a given rotation of movement of what may be considered the input member of the train of gear mechanism may not always result in the desired advance of the seed plate. One means intended to secure the proper advance of the seed plate or plates in response to a given movement of the input member of the train of gearing is illustrated in U.S. Patent 1,236,028, issued August 7, 1917, to C. White. According to this invention in assembling the planter the various gears are initially disposed in the proper position by virute of what is termed timing marks on the gears and/or other parts whereby the gears or other parts are brought into the proper correlation.

It has recently been found, especially when planting under high speed conditions, that even though all the gears are properly timed, utilizing the timing marks just mentioned, it sometimes occurs that the seed plates get out of time and, for example, come to rest with a space between the seed cells disposed over the associated shank and the associated knocker located between two adjacent seed cells whereas in the preferred operation the knocker should lie in the seed cell that is disposed substantially directly over the planter shank. This variation may result in improper planting because, instead of each hill containing the desired number of kernels, one hill may have one or even two kernels less than the desired amount and the next hill will have more kernels than the desired amount.

It is therefore, an important feature of this invention to provide means for securing a properly timed planter, irrespective of variations in the gear train that may be present due, for example, to wear or manufacturing tolerances, or both, and it is also a feature of this invention to provide means for restoring proper timing to planters already in the field that for some reason get out of time due to wear or the like in service. Specifically, means is provided between the seed plate and the associated output member of the driving gear train to provide an adjustment whereby, not withstanding manufacturing tolerances and wear, or other variations, the seed plates come to rest at the end of each cycle of operation in exactly the position desired.

More specifically, this invention contemplates the provision of adjustment between the output member or final drive gear under the seed hopper and the associated part that is connected to drive the associated seed plate. The extent of adjustment available is, according to this invention, sufficient to accommodate shifting the final drive gear under the seed hopper from one tooth to the next tooth of the pinion that drives the gear. Thus, the mechanism of this invention provides for any adjustment necessary to secure proper timing or bringing the planter back into proper time.

These and other objects of this invention will be apparent to those skilled in the art after a consideration of the following detailed description, taken in conjunction with the accompanying drawings, in which.

Figure 1:
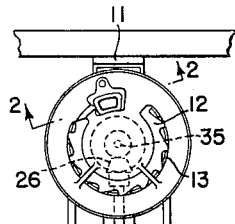
Fig. 1 is a plan view, partly diagrammatic in nature, showing the driving train disposed between the controlling clutch and the output member of the train and the associated plate-advancing means.
Figure 2:
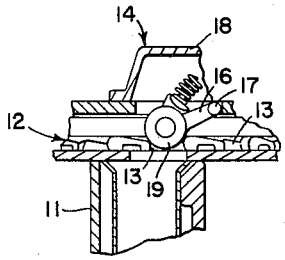
Fig. 2 is an enlarged sectional view taken generally along the line 2—2 of Fig. 1, showing the knocker and the preferred position of the seed plate at the end of a cycle of operation.

Referring first to Fig. 1, the reference numeral 10 indicates one of the runners of a multi-row planter, the runner having a generally vertically disposed hollow shank 11 into which seed is deposited. Each runner 10 carries a seed hopper (not shown) at the bottom of which is disposed a rotatable seed selecting plate 12 having a plurality of seed cells 13 disposed uniformly about the periphery of the plate. At a point substantially directly above the rear portion of the seed plate that passes over the seed shank, the hopper carries a knocker unit 14 that, as best shown in Fig. 2, comprises a spring biased arm 16 pivoted at 17 on the supporting part 18 that preferably includes a casing or cover for the knocker. One end of the pivoted arm 16 carries a small roller 19 that is adapted to enter each seed cell 13 as the latter passes over the shank 11 and ejects the seed downwardly therefrom. The shank, seed plate and knocker units just referred to are substantially identical with the corresponding parts shown in U.S. Patent 2,340,163, issued January 25, 1948, to Charles H. White, this patent also showing seed-accumulating valve mechanism that receives two, three or four kernels according to the extent to which the seed plates are driven at each cycle of operation. In view of the disclosure in the White patent just mentioned it is deemed unnecesary to show any such valve mechanism in the accompanying drawings.

In the conventional multi-row planter, each of the several seed plates is rotated by a train of gears and associated parts from a constantly rotating jack shaft, which is indicated in Fig. 1 by the reference numeral 21. The train of gearing just mentioned includes a self-interrupting clutch C and a cluster or assembly of ratio changing gears G, all enclosed with the clutch C in a casing 22.

The clutch C is operated periodically in hill dropping or check rowing and, generally speaking, acts to drive a part through one complete revolution. This rotation is transmitted through the speed change gears to rotate a driven shaft 23 varying amounts, depending upon the gear selection in the unit G. The driven shaft 23 is connected through a pair of bevel gears 24 to drive a fore-and-aft extending shaft 25 that, in turn, acts through a drive pinion 26 (Fig. 1) and a final drive gear 27 to drive the associated seed plate.

As mentioned above, in the conventional operation of mechanism of this kind, at each operation of the clutch C the train of parts just described acts to rotate the seed plate 12 associated therewith through a given extent of rotation and then stop, remaining stationary until the next cycle is initiated. For accurate seed selection it is necessary that at the end of each cycle each of the seed plates should stop in a position with a seed cell located substantially directly under and receiving the knocker roller 19, as is illustrated in Fig. 2. The shaft 21 is power driven always in the same direction and whatever slack or lost motion there may be in the multiplicity of driving parts, extending from the clutch C to the seed plates 12, may be tolerated so long as each of the seed plates 12 comes to rest with the knocker 19 in a seed cell 13. Such looseness or lost motion usually develops from two sources, either through manufacturing tolerances or wear of the several parts. When the planter is produced and assembled at the factory, the several gears are all assembled in the proper way by virtue of timing marks on certain of the teeth as mentioned above. That is, considering only one pair of gears, one gear will have one of its teeth formed with a mark and the companion gear will have two adjacent teeth formed with such marks, and then when the planter is built the gear having the single tooth that is marked is assembled with the companion gear so that the marked tooth comes in between the two marked teeth on the companion gear. Thus, when the planter is built all of the gears are correctly timed when assembled, and, further, the timing may be checked in the field whenever desired by observing whether during operation the marked tooth on one gear comes in between the two marked teeth on the companion gear. Generally speaking, after a planter has been properly built and the gearing properly timed it is not necessary to retime the gearing unless some of the planter gears have been removed and reinstalled. However, wear naturally occurs over long periods of use and sometimes the extent of wear or looseness is such that at the end of one cycle of operation of the clutch, one or more of the seed plates do not come to rest at the proper position. That is, for example, a seed plate may come to rest with the knocker 19 lying midway between two seed cells 13. When this condition exists, seed selection is inaccurate and if, for example, the planter is set to select three seeds for each hill, as a result of such wear, looseness and slack, some hills may have only one or two seeds and the next hill will have four or perhaps five. This obviously is undesirable and the present invention provides means whereby the gearing may be brought to the proper timing, notwithstanding excessive wear or unusual manufacturing tolerances that, being cumulative, may cause the planter to be out of time.

Figure 3:
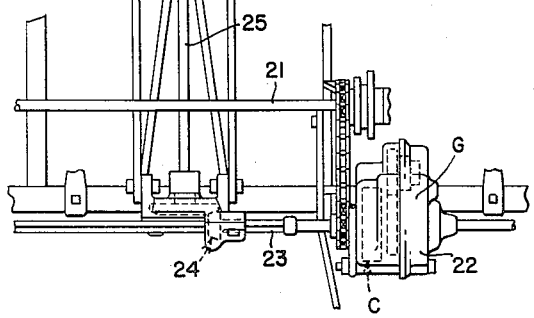
Fig. 3 is an enlarged fragmentary plan view of the adjustment provided between the final drive gear under the seed hopper and the part connected therewith that connects directly to and drives the associated seed plate.
Figure 3:
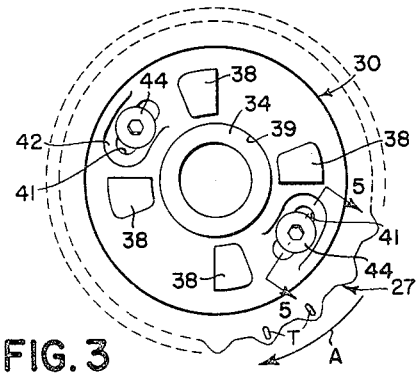
Figure 4:
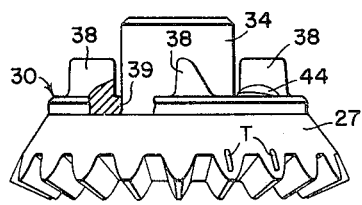
Fig. 4 is an edge view of the gear shown in Fig. 3.
Figure 5:
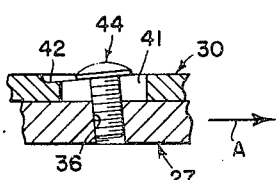
Fig. 5 is a section 5—5 of Fig. 3.

In the conventional planter the seed plates are driven by means having lugs that are engaged by lugs on a conventional final drive gear, similar to the gear 27. According to this invention I provide a final drive gear 27 that is of particular construction. As best shown in Figs. 3 and 4, instead of forming seed plate driving lugs directly on the final drive gear, I provide an adjustable part 30 between the gear 27 and the lugged seed plate driving means associated therewith. The gear 27 is also shown as provided with two conventional timing marks T, and the gear 27 is formed with a hub 34 that is mounted for rotation on the more or less conventional stud 35 (Fig. 1) that is carried on the hopper bottom. The face of the gear 27 adjacent the part 30 is provided with two generally diametrically opposed tapped openings 36, as shown in Fig. 5. These openings are not perpendicular to the face of the gear but are angled at about 5°. The adjustable part 30 is formed generally as a disk and is provided with drive lugs 38 that engage the lugs on the conventional seed plate driving means. The part 30 has an enlarged central opening 39 that permits the part to be applied over the hub 34 of the gear 27. Opposite portions of the part 30 are provided with circumferentially elongated slots 41 and the outer faces of the slotted portions, as shown at 42, are angled about 5° relative to the plane of the part, thus disposing the faces 42 perpendicular to the axes of the tapped openings 36. These faces 42 are angled away from the adjacent face of the gear in the direction in which the gear drives the part 30, which is in the direction indicated by the arrow A, in Figs. 3 and 5. Conventional screw threaded headed fasteners 44 are screwed into the tapped openings 36 for fixing the associated part 30 to the gear 27 in different positions of adjustment about the axis of rotation of the gear.

Each of the slots 41 is slightly longer than the tooth spacing of the associated gear. Thus, gearing that becomes badly out of time may readily be brought back to proper timing even if it should be necessary to move the gear one tooth spacing either forwardly or rearwardly relative to the normal direction of the drive, the length of each slot 41 being in excess of the tooth spacing making this possible. The angle of the faces 42, as shown in Fig. 5, produces a wedging action when the gear 27 is rotated. Hence, there is little likelihood of the screws 44 loosening in service.

What I have shown and described above, the preferred structure with which the principles of the present invention have been incorporated it is to be understood that my invention is not to be limited to the particular details, shown and described above, but that, in fact, widely different means may be employed in the practice of the broader aspects of my invention.

What I claim, therefore and desire to secure by Letters Patent is:

In a planter, seed selecting mechanism including the combination with a rotatable plural-celled seed plate, of a part connected with said plate to advance the latter through a predetermined extent of rotation, driving means, a train of interconnected gearing connected with said driving means to be driven therefrom, said gearing including input and output gears and a plurality of intermediate intermeshing gears, said gears being subject to wear and to manufacturing tolerances that accumulate at the output gear whereby the latter may be rotationally displaced relative to a normal position with respect to said input gear, means connecting the input gear to said driving means to be driven therefrom, and angularly adjustable means connecting the output gear to said part whereby positional errors accumulated in said gearing may be compensated and said seed plate brought to the correct position irrespective of said errors, said output gear having a pair of tapped openings disposed at a slight angle relative to the adjacent face of said gear, said part lying against said face and having slots registering with said openings, the faces of said slotted portions being shaped to lie at 90° to the axes of said tapped openings, and headed threaded fasteners screwed into said openings for fixing said part in different positions of adjustment relative to said gear about the axis of the latter, the planes of said slotted portions being angled away from the adjacent face of the gear in the direction in which said gear drives said part.

References Cited in the file of this patent

UNITED STATES PATENTS

| | | |
|---|---|---|
| 781,219 | Mills | Jan. 31, 1905 |
| 2,340,163 | White | Jan. 25, 1944 |